G. H. GIBSON.
WATER HEATING APPARATUS.
APPLICATION FILED SEPT. 4, 1909.
1,036,826.
Patented Aug. 27, 1912.
2 SHEETS—SHEET 1.
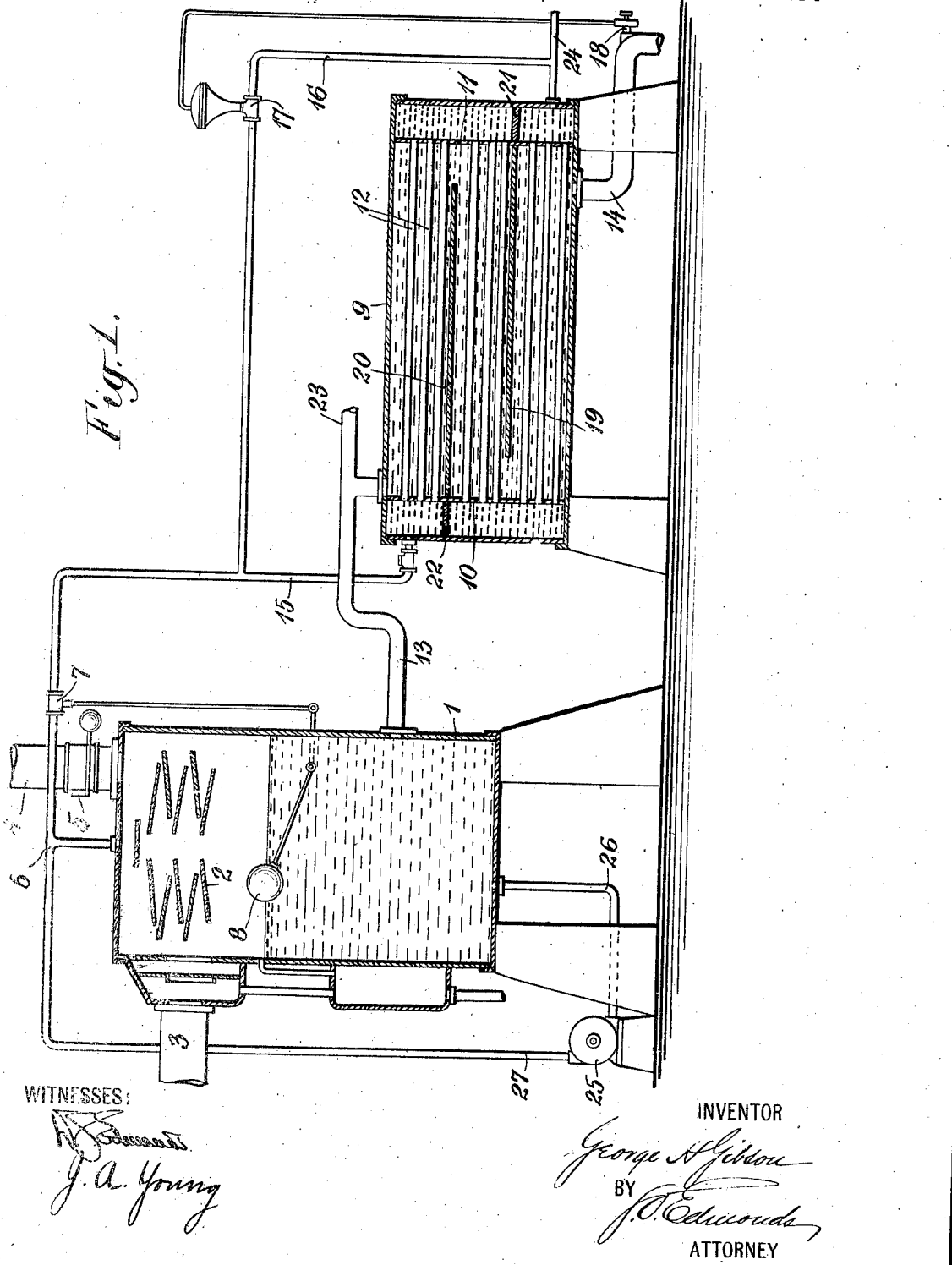
WITNESSES:
INVENTOR
George H. Gibson
BY
ATTORNEY

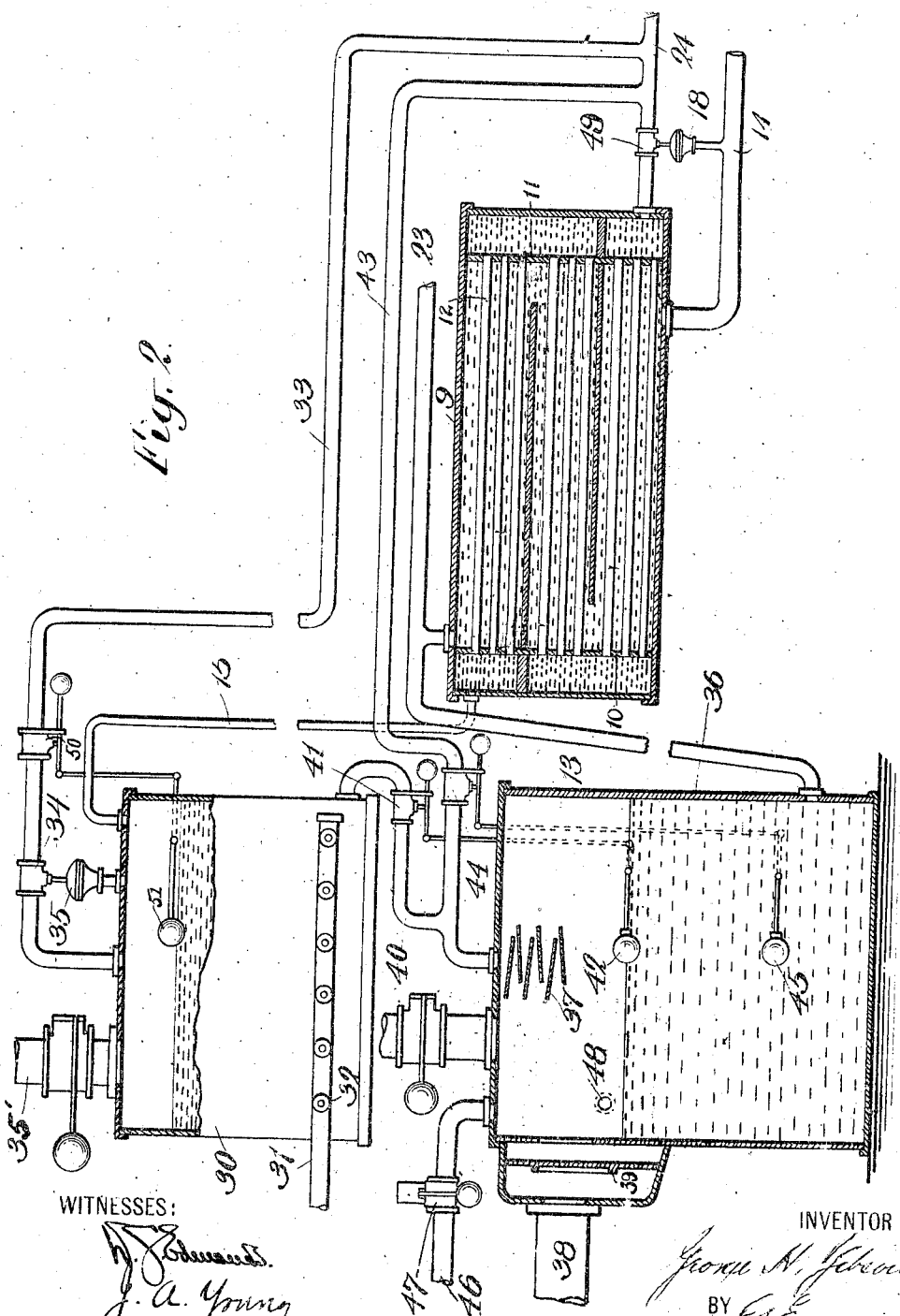

UNITED STATES PATENT OFFICE.

GEORGE H. GIBSON, OF MONTCLAIR, NEW JERSEY, ASSIGNOR TO HARRISON SAFETY BOILER WORKS, OF PHILADELPHIA, PENNSYLVANIA, A COPARTNERSHIP.

WATER-HEATING APPARATUS.

1,036,826.   Specification of Letters Patent.   Patented Aug. 27, 1912.

Application filed September 4, 1909. Serial No. 516,204.

*To all whom it may concern:*

Be it known that I, GEORGE H. GIBSON, a citizen of the United States, residing at Montclair, in the county of Essex and State of New Jersey, have invented certain new and useful Improvements in Water-Heating Apparatus and Methods of Operating the Same, of which the following is a specification.

This invention is directed to the provision of an improved form of apparatus for supplying water for heating systems, boilers and the like, under such conditions that water at either of two different temperatures may be required for use from time to time.

The invention has reference particularly to the provision of an apparatus for use in locomotive round-houses, in supplying water for both washing and filling the boilers of the locomotives.

In filling the boilers of locomotives, it is desirable to use water which has been heated to a temperature of or near 212° Fahrenheit, so that a minimum time will be required to put a locomotive in condition for service. This water, however, is too hot for use by the workmen in washing the boiler of a locomotive to remove scale therefrom, but the water for washing should be heated somewhat, as the boiler cannot be readily washed with cold water. With the apparatus constructed in accordance with my invention, the supply of hot water for filling a locomotive is maintained and when desired water at the proper temperature for washing may also be obtained.

The invention involves the provision of a water-heater for heating water to a temperature of approximately 212° Fahrenheit and devices whereby heat may be exchanged from this body of water to another body of water in order to bring the latter body of water to the temperature desired for washing; that is, about 130° Fahrenheit. The means by which the exchange of heat is effected may be such that cold water is raised to the temperature for washing by the exchange of heat to it from the hot water, or cold water may be employed for reducing the temperature of water drawn from the hot water supply to the temperature desired for washing water. A supply of washing water is thus provided, and this is effected in an economical manner.

I have illustrated an embodiment of my invention in the accompanying drawings, in which—

Figure 1 shows the apparatus employed diagrammatically, and Fig. 2 is a similar view illustrating a modification.

Referring first to Fig. 1, the water-heater is illustrated at 1, this being of the usual or any suitable construction. This heater consists of a water-chamber having one or more series of trays 2, over which the water admitted to the tank may fall while steam entering the tank through the steam-pipe 3 is passing upwardly through the trays. Most of the steam is condensed by its contact with the water falling over the trays, and it imparts its heat to the water so that the water collecting in the bottom of tank 1 is heated by the steam to a temperature approaching 212° Fahrenheit. The steam which is not condensed by the water passes to the atmosphere through an exhaust-pipe 4, this pipe being preferably provided with a pressure-relief-valve 5. Water is admitted to the top of the tank 1 by a pipe 6, this supply of water to the tank being controlled by a valve 7 in the pipe 6, operated by a float 8 in the tank 1. In combination with this heater, I employ a device 9, having the form of a closed heater. This consists of a cylindrical casing having headers 10 and 11 mounted therein, one adjacent to each end of the tank, and a plurality of pipes 12 extending between these headers and communicating with the chambers between the headers and the ends of the tank. This tank 9 serves as a heat-exchanger, as within it, heat units in one body of water are transmitted into another body of water. A pipe 13 leads from the heater 1 to the portion of the heat-exchanger 9 between the headers 10 and 11, and a pipe 14 leads from this portion of the heat-exchanger, preferably at the opposite end thereof. A cold water supply pipe is shown at 24, this being connected to the chamber between the header 11 and the adjacent end of the heat-exchanger at the bottom of this chamber. A pipe 15 leads from the top of the chamber between the header 10 and the adjacent end of the heat-exchanger 9, and is connected with the pipe 6 leading to the top of the heater 1. A pipe 16 forms a by-pass around the heat-exchanger 9, this being connected to the pipes 24 and 15 as shown. In the pipe 16 is a valve 17, operated by a thermostat 18, the end of which projects into the pipe 14. Preferably baffles 19 and 20 are provided within the portion of the heat-exchanger between the headers 10 and 11, the former extending from the header 11 in one direction and the latter extending from the header 10 in the opposite direction. Also baffles 21 and 22 are provided in the chambers at the ends of the heat-exchanger, the former being in line with the baffle 19 and the latter in line with the baffle 20.

With the apparatus thus constructed, the operation is as follows:—Cold water is admitted to the heater 1 through the pipes 24, 16, 15 and 6, and steam is admitted to the heater through the pipe 3, this steam being drawn from any suitable source, as, for instance, the exhaust from stationary engines, and, if desired, the steam blown off from a locomotive in emptying the boiler thereof. The water passing down over the trays 2 while the steam is passing upwardly through these trays becomes heated and collects at the bottom of the heater 1, this water rising to a level within the heater permitted by the float-operated valve 7. The water in the tank 1 is thus maintained at a temperature of 212° Fahrenheit. When it is desired to fill the boiler of a locomotive, this heated water is drawn from the tank 1 through a pipe 23 connected with the pipe 13, a pump being preferably provided in the pipe 23 for forcing the water to the boiler. The water which passes through the heat-exchanger 9 between the headers 10 and 11 is reduced to the temperature desired for the washing water. When the water falls below this temperature, the thermostat 18 operates to open the valve 17, so as to allow a portion or all of the cold water supplied to the heater 1 to pass to the heater in the manner above described; that is, through the pipe 16 constituting a by-pass around the exchanger. If the temperature of the washing water passing through the exchanger between the headers 10 and 11 rises above the temperature desired for the washing water, the thermostat 18 closes the valve 17, so that the water supplied to the heater 1 passes from the supply-pipe 24 through the chambers at the ends of the heat-exchanger and the pipes 12 to the pipe 15 and then to the pipe 6 and heater 1. This cold water passing through the tubes 12 of the heat-exchanger is heated by the exchange of heat units from the hot water which surrounds the tubes 12, and by thus abstracting heat units from this water surrounding the tubes 12 the temperature of the latter is reduced to that desired for the washing water to be drawn from the exchanger through the pipe 14. It will thus be seen that an automatic regulation of the temperature of the washing water is effected by passing cold water through pipes surrounded by this washing water whenever the temperature of the washing water exceeds that which is desired, so as to abstract a portion of the heat from this washing water; and whenever the washing water within the heat-exchanger 9 is at or below the desired temperature, the valve 17 is automatically opened by the thermostat 18, so that the cold water admitted to the heater passes around, instead of through, the heat-exchanger. The baffles 19, 20, 21 and 22 are so arranged that the warmer portion of the cold water leaves the heat-exchanger at a point close to that at which the hotter portion of the hot water is admitted to the exchanger; that is, the cold water enters the exchanger at the bottom of the chamber between the header 11 and the adjacent end of the heat-exchanger, flows through the lower section of tubes 12 to the chamber at the opposite end of the exchanger, then back through the tubes above the baffle 19, and then in the opposite direction through the tubes above the baffle 20, so that the water passing from the heat-exchanger into the pipe 15 is the water which has been warmed somewhat by the exchange of heat from the water surrounding the tubes 12; and the hot water is admitted to the section of the heat-exchanger above the baffle 20, flows in one direction around that baffle, then in the opposite direction in order to pass around the baffle 19, and then out through the pipe 14, so that it is the hot water which has had its temperature reduced which flows out of the exchanger through the pipe 14 at a point adjacent to that at which the cold water is first admitted to the exchanger.

The heat-exchanger 9 would of course be constructed to facilitate the exchange of heat units from one body of water to the other therein; to this end, the tubes 12 would preferably be made of copper and would be only of sufficient thickness to give them the requisite mechanical strength.

In order to aid in keeping the water within tank 1 at or near the desired temperature 212° F., I prefer to provide a circulating system whereby water is drawn from the bottom of tank 1 and carried to the top thereof so that it will pass down over the trays 2 and be again subjected to the heating effect of steam entering through pipe 3. Such a circulating system is shown as a pump 25 connected to the bottom of tank 1 by a pipe 26 and to the pipe 6 by a pipe 27.

With the apparatus herein illustrated operating as above described, a supply of filling water is at all times maintained, heated by such exhaust steam as may be available; when washing water is required, the temperature of a portion of this filling water is reduced so as to bring it to the temperature desired for the washing water; this reduction of temperature is effected by transferring a portion of the heat in the water to another body of water; and the heat thus transferred is utilized by employing the water thus heated for supplying the main water-heater.

The same or closely similar apparatus may be employed in operating in a somewhat different manner to accomplish the same ends. Instead of reducing the temperature of a portion of the filling water to provide washing water, using for this purpose cold water, I may raise the temperature of cold water to that desired for washing water, using for this purpose the filling water. To operate in this manner, cold water would be admitted to the space around the tubes 12 within the exchanger and drawn off through the pipe 14 when required for washing; and filling water from tank 1 would be carried through the tubes 12 so as that by the transfer of heat units it would raise the temperature of this cold water to about 130° F. Preferably the tubes 12 would be arranged for insertion in the circulating system for the heater 1 by running the pipe 27 from the pump 25 to the pipe 24; then hot water from the heater 1 would be passed through tubes 12 when required for heating the water around those tubes and when not so required the valve 17 would be operated automatically by the thermostat 18 to open the by-pass around the exchanger through the pipe 16.

Fig. 2 illustrates apparatus similar in many respects to that illustrated in Fig. 1 and above described, this involving the use of a heat-exchanger 9. However, instead of providing a single device in which water is heated and stored, two devices are employed each provided with means for employing steam to heat the water therein and one of which may draw its supply of water from the other or from the cold water supply-pipe. The cold water supply-pipe is shown at 24 this leading to the heat-exchanger 9 and a pipe 15 carries this water from the exchanger. A tank is shown at 30 having a pipe 31 running along the side thereof and near the bottom a plurality of devices 32 for making connection from the pipe 31 to the interior of the tank 30. The pipe 31 is arranged for connection to the boiler of the locomotive so that steam blown off from the locomotive in emptying it will pass through the connections 32 to the interior of the tank 30; this steam rising in the tank 30 will be condensed by the water and will impart its heat to the water. A by-pass for the cold water around the heat-exchanger 9 is shown at 33 and in this by-pass is a valve 34 operated by a diaphragm within a casing 35 in direct response to changes of pressure within the tank 30. The tank is provided with an exhaust pipe 35' having a pressure relief valve therein. A second storage tank is shown at 36, this preferably having the form of a feed-water heater. The heater may be of any suitable type but as it is here shown it is provided with a plurality of trays 37 over which the water passes so as to take up the heat of the steam rising within the heater. Exhaust steam from any suitable source, as for instance, the exhaust from stationary engines about the plant, enters the heater 36 through the pipe 38 a separator being provided at 39 in the usual manner. Water is supplied to the heater 36 from the tank 30 through a pipe 40 and in this pipe is a valve 41 controlled by a float 42 within the heater 36. Water may also be supplied to the heater 36 from the cold water supply-pipe 24 through a pipe 43 and in this pipe is a valve 44 operated by means of the float 45 in the heater 36, the float 45 being a substantial distance below the float 42, as shown in the drawings. In order to insure the proper heating of the water admitted to the tank 36, in case the supply of exhaust steam through the pipe 38 is insufficient for this purpose I provide a pipe 46 for the heater 36 to carry live steam to the heater from a suitable source, this pipe having a pressure-reducing valve 47 therein so that the passage-way for the steam through pipe 46 will be opened only when an insufficient supply of steam is carried to the heater 36 by the pipe 38. The heater 36 is provided with a suitable over-flow opening 48, leading to waste. The hot water is drawn from the water-chamber at the bottom of the heater 36 through a pipe 13 by means of a suitable pump to which this pipe is connected and connection is made from the pipe 13 to the portion of the heat-exchanger between the headers 10 and 11 as above described. The thermostatically-operated valve controlled by the temperature of the washing water drawn from the heat-exchanger through the pipe 14 is, in the construction shown in Fig. 2, located in water-supply pipe 24 as indicated at 49 instead of being located in the by-pass for the cold water around the exchanger as in the apparatus shown in Fig. 1, this valve being placed between the heat-exchanger and the points of connection of the pipes 33 and 43 to the supply-pipe 24. In the tank 30 is a float 51 arranged to operate a valve 50 in the pipe 33.

In operating with the apparatus shown in Fig. 2 the cold water to be heated to supply washing and filling water is drawn from the pipe 24 and when the valve 49 is opened by the thermostat 18, this cold water passes through the heat-exchanger 9 and the pipe 15 to the tank 30. If the valve 49 were closed the cold water would pass through the pipe 33 to the tank 30 if the valves 34 and 50 were opened in response to a pressure within the tank 30 resulting from the admission of steam to the tank and a lowering of the water level within the tank. When steam is blown off from the locomotive boiler, in emptying the latter, it passes through the pipe 31 and openings 32 and rises through the water in the tank 30 imparting its heat to this water so that the heat units in the blow-off steam are utilized in raising the temperature of water which is afterward to be used in washing and filling. Whenever the level of the water within tank 36 falls low enough to operate the valve 41 by float 42, this heated water is drawn from tank 30 through the pipe 40 to the heater 36 in sufficient quantity to raise the level of the water in tank 36 the desired amount, but if there is no water within the tank 30 due to the fact that the valve 34 has not been opened in response to pressure within tank 30, water will not be supplied to the heater 36 when the valve 41 is opened and, if more water is drawn from heater 36 to such extent that the level of the water falls low enough to operate the float 45, the valve 44 will be opened and cold water will flow from the supply-pipe 24 through the pipe 43 to the heater 36. It will thus be apparent that the level of the water within heater 36 will never fall below the level at which the float 45 operates but by reason of the provision of the two floats and their corresponding valves the heater 36 will always be supplied with heated water from the tank 30 if there is any water in the latter tank and only in case there is no water in tank 30 will cold water be supplied to the heater direct from the pipe 24. The water in heater 36 will always be maintained at a temperature of 212 degrees F. for the reason that if ever the supply of exhaust steam to the heater 36 through the pipe 38 is insufficient to raise the temperature of the water entering heater 36 to this point, live steam will be admitted to the heater 36 through the pipe 46 since the valve 47 will open automatically when the supply of exhaust steam through the pipe 38 is insufficient. The hot water for filling a locomotive boiler may be drawn from the heater 36 through the pipes 13 and 23 and when water for washing a boiler is required this water will be drawn from the heater 36 through the exchanger 9 and pipe 14, its temperature being reduced from 212 degrees F. to approximately 130 degrees F. by reason of the exchange of a portion of its heat to the cold water passing through the tubes 12 of the heat-exchanger.

Having now described my invention, what I claim as new therein and desire to secure by Letters Patent is as follows:

1. The combination of a water-heater, a water-supply pipe connected thereto, a steam connection for supplying steam to the heater to mingle with and heat the water supplied by said pipe, a pipe for carrying hot water from the heater to a point of use, a passageway for carrying hot water from the heater, means connected to said passageway for transferring heat from the hot water flowing through the passageway to a second body of water without mingling said bodies of water, a pipe for conveying said second body of water from said means to said water-supply pipe, and a pipe for conveying the other of said bodies of water from said means to the point of use, substantially as set forth.

2. The combination of a heater, a heat-exchanger, a water-supply pipe connected to the exchanger, means for carrying the water supplied by said pipe from the exchanger to the heater, means for supplying steam to the heater to mingle with and heat the water entering the heater from said water-supply pipe, means for carrying the heated water from the heater to a point of use, and other means for carrying the heated water from the heater first through the exchanger to cause it to heat the water supplied to the exchanger by said water-supply pipe without mingling therewith and then to a point of use, substantially as set forth.

3. The combination of a heater, a heat-exchanger, a water-supply pipe connected to the exchanger, means for carrying the water supplied by said pipe from the exchanger to the heater, means for supplying steam to the heater to mingle with and heat the water entering the heater from said water-supply pipe, means for carrying the heated water from the heater to a point of use, other means for carrying the heated water from the heater first through the exchange to cause it to heat the water supplied to the exchanger by said water supply pipe without mingling therewith and then to a point of use, and a by-pass pipe connected to the water-supply pipe and to the heater for carrying water from the water-supply pipe to the heater without passing through the exchanger, substantially as set forth.

4. The combination of a heater, a heat-exchanger, a water-supply pipe connected to the exchanger, means for carrying the water supplied by said pipe from the exchanger to the heater, means for supplying steam to the heater to mingle with and heat the water entering the heater from said water-supply pipe, means for carrying the heated water from the heater to a point of use, other means for carrying the heated water from the heater first through the exchanger to cause it to heat the water supplied to the exchanger by said water supply pipe without mingling therewith and then to a point of use, and a by-pass pipe connected to the water-supply pipe and to the heater for carrying water from the water-supply pipe to the heater without passing through the exchanger, a valve for regulating the flow of water from said water-supply pipe to the heat-exchanger, and a thermostat controlling said valve.

5. The combination of a water-heater, a water-supply connected thereto, a steam connection for supplying steam to the heater to heat the water, a passageway for carrying the heated water from the heater, means for transferring heat from said water to another body of water without mingling said bodies of water, a pipe for conveying one of said bodies of water from said means to the heater, a pipe connected to said means for conveying the other of said bodies of water, a pipe forming a by-pass around said means for the water conveyed by one of said pipes, a valve for regulating the flow of one of said bodies of water in said means, and a thermostat controlling said valve, substantially as set forth.

6. The combination of an open heater, a closed heater, a water-supply pipe carrying water to the closed heater and thence to the open heater, means for supplying steam to the open heater to mingle with and heat the water entering the open heater from said water-supply pipe, means for carrying hot water from the open heater to the point of use, and other means for carrying hot water from the open heater through the closed heater without mingling with the water entering the closed heater from the water-supply pipe and then to the point of use, substantially as set forth.

7. The combination of an open heater, a closed heater, a water-supply pipe carrying water to the closed heater and thence to the open heater, means for supplying steam to the open heater to mingle with and heat the water entering the open heater from said water-supply pipe, means for carrying hot water from the open heater to the point of use, and other means for carrying hot water from the open heater through the closed heater without mingling with the water entering the closed heater from the water-supply pipe and then to the point of use, and a by-pass pipe for carrying water from the water-supply pipe to the open heater without passing through the closed heater.

8. The combination of two heaters, a heat-exchanger, a water-supply pipe, means for admitting water to either of said heaters from said supply pipe, means for admitting water to one of said heaters from said supply-pipe through the heat-exchanger, and means for withdrawing water from one of said heaters through the heat-exchanger, substantially as set forth.

9. The combination of two heaters, a heat-exchanger, a water-supply pipe, means for admitting water to either of said heaters from said supply pipe, means for admitting water to one of said heaters from said supply-pipe through the heat-exchanger, means for withdrawing water from one of said heaters through the heat-exchanger, and means for admitting water from one of said heaters to the other, substantially as set forth.

10. The combination of two heaters, a heat-exchanger, a water-supply pipe, means for admitting water to one of said heaters from said supply pipe, means for admitting water to said heater from said supply pipe through the heat-exchanger, means for admitting water from said heater to the second heater when the water in the second heater falls to a predetermined level therein, means for admitting water to the second heater from the supply pipe when the water in the second heater falls to a lower level therein, and means for withdrawing water from one of said heaters through the heat-exchanger, substantially as set forth.

11. The combination of a heat-exchanger, a water heater, a water supply, means for admitting water to the heater from the water supply through the heat-exchanger, means for admitting water to the heater from said water supply without passing through the heat-exchanger, a pipe carrying exhaust steam to the heater to heat the water therein, a live steam connection to the heater, a pressure-reducing valve in said connection, a float in said heater controlling the supply of water thereto, and a pipe for withdrawing water from the heater through the heat-exchanger, substantially as set forth.

This specification signed and witnessed this 20th day of August, 1909.

GEO. H. GIBSON.

Witnesses:
D. S. EDMONDS,
HENRY MEYER.